United States Patent [19]

Baer et al.

[11] Patent Number: 4,567,532

[45] Date of Patent: Jan. 28, 1986

[54] SELECTABLE VIEW VIDEO RECORD/PLAYBACK SYSTEM

[75] Inventors: Ralph H. Baer, Manchester, N.H.; David Allen, Scituate, Mass.

[73] Assignee: Sanders Associates, Inc., Nashua, N.H.

[21] Appl. No.: 532,874

[22] Filed: Sep. 16, 1983

[51] Int. Cl.$^4$ .............................................. H04N 5/76
[52] U.S. Cl. ..................................... 358/342; 358/907
[58] Field of Search ................... 360/33.1, 10.1, 10.2, 360/10.3, 11.1, 35.1; 358/108, 181, 335, 342, 907; 369/32; 434/323, 43; 273/DIG. 28; 364/521, 410

[56] References Cited

U.S. PATENT DOCUMENTS

| | | | |
|---|---|---|---|
| 3,829,610 | 8/1974 | Meeussen et al. | 358/342 |
| 3,911,484 | 10/1975 | Mutou et al. | 360/35.1 |
| 4,094,013 | 6/1978 | Hill et al. | 369/32 |
| 4,198,656 | 4/1980 | Mathisen | 358/108 |
| 4,305,131 | 12/1981 | Best | 364/521 |
| 4,360,876 | 11/1982 | Girault et al. | 364/521 |
| 4,463,389 | 7/1984 | Golding | 358/342 |
| 4,475,132 | 10/1984 | Rodesch | 358/342 |

OTHER PUBLICATIONS

John Free, "Through the Electronic Looking Glass into Living Pictures", *Popular Science*, Aug. 1981, pp. 68-70.

*Primary Examiner*—Donald McElheny, Jr.
*Attorney, Agent, or Firm*—Louis Etlinger; R. I. Seligman

[57] ABSTRACT

A video recorder and playback system adapted to provide the viewer with selectable views of the action in progress. During recording, a plurality of cameras simultaneously record the action in progress on addressable subtracks of a multi-track loop recording medium such as a laser disk or magnetic surfaced disk. At playback time, the playback and display portion of the system is adapted to read from the same subtract on sequential tracks beginning at a selected starting point. Means are provided for the viewer to change on demand the one of the subtracks being read whereby the view can be instantaneously changed by selecting the one of the subtracks containing the desired view.

3 Claims, 10 Drawing Figures

SELECTABLE VIEW VIDEO RECORD/PLAYBACK SYSTEM

BACKGROUND OF THE INVENTION

The present invention relates to video record/playback systems and, more particularly, to a system wherein multiple views are simultaneously recorded and are selectable and changeable at playback time.

Continuous loop record and playback devices are well known in the art. For example, as shown in FIG. 1, the so-called "8-Track" cartridge, generally indicated as 10, which is used for audio recording/playback, comprises a housing 12, having an extended loop of magnetic tape 14 therein. As shown by the arrows, in use, the tape 14 is pulled out of the center of a coiled portion 16 across readheads 18 and is wound back onto the outside of the coiled portion 16.

One of the more recent video record/playback devices is the laser video disk such as that shown simplified in FIG. 2. The disk is recorded in a studio and played back with, for example, a home television set and disk player. In the video disk system, generally indicated as 20, at playback time, the video disk 22 is rotated on shaft 24 by motor 26. A laser beam 28 from source 30 passes through the disk 22 to strike a photodetector 32. Information within the disk 22 as recorded therein modulates the laser beam 28 as it passes therethrough such that the electrical signal on lines 34 is a reflection of the information on the disk 22 and can be used to drive a video display.

In both of the aforementioned devices, a sequencing system is provided to move the reading apparatus from track to track. As shown in FIG. 3, the tape 14 of the 8-track cartridge 10 is divided into four major tracks 36 across the width of the tape 14. Each track 36 is subdivided into two subtracks comprising the "A" and "B" channels of the stereo system. Readheads 18 comprise a side-by-side pair of identical heads 38 and 40 assigned to the A and B channels, respectively. As shown in FIG. 3(a), the heads 18 are initially positioned at track number 1. As the tape 14 is moved past the heads 18, head 38 reads the channel A information on track number 1, and head 38 reads the channel B information and electrical signals reflecting that data are developed on lines 42 and 44, respectively, which can be amplified and output as stereo music reflecting the contents of track number 1. Upon track number 1 arriving at a point thereon with an "end of track" marker (not shown), the heads 18 are skipped one track to the position of FIG. 3(b) where they are reading the data from track number 2. Upon reaching the "end of track" on track number 2, the heads 18 are skipped one more track to track number 3 as shown in FIG. 3(c). Similarly, at the "end of track" of track 3, the heads 18 are shifted to track 4 as shown in FIG. 3(d). At the end of track 4, the heads 18 are again skipped one track from track 4 to track 1 which, physically, involves skipping back over tracks 2 and 3 to the track number 1 position. Typically, a user "skip" button is provided which, when pushed, causes the heads 18 to skip to the next track 36 as if the "end of track" signal had been read. In addition to the more commonly known stereo players, such a system was also used in a robot toy game manufactured and sold by MEGO under the name "2XL".

Turning to FIG. 4, the disk 22 of the video disk system 20 of FIG. 2 is shown in plan view with a typical data track layout shown and numbered. In this particular instance, the tracks 46 comprise consecutive rings on the disk 22. Each track 46 begins and ends at the same point. As the disk 22 rotates between the laser source 30 and the photodetector 32, an appropriate sensing mechanism (not shown) senses the end of track, i.e. vertical intervals, (indicated by the dashed line 48) and causes an appropriate mechanism (also not shown for simplicity) to skip the laser source 30 and photodetector 32 in combination inward towards the shaft 24 in the direction of the arrows 50 one track 46. Typically, for convenience, each track 46 represents one "frame" on the video display. Thus, for example, if 30 frames are shown each second as with standard NTSC television to prevent flicker, a typical one and one-half hour television motion picture would occupy approximately 181,000 tracks 46 on each of two sides of disk 22.

Basic prior art switching logic for a video disk system such as that shown as 20 in FIG. 2 and as described with respect to FIG. 4 is shown in FIG. 5. At decision block 5.1 the logic checks for the end of track 48. If it is the end of track, at action block 5.2 the logic skips the laser source 30 and photodetector 32 in combination one track as just described. In either case, the logic next checks at decision block 5.3 as to whether a "skip" has been requested. This feature is typically provided in the manner of the skip button described with respect to FIG. 3 whereby the heads 18 could be jumped from track to track. Quite often, a video disk system will have a "fast forward" button wherein the viewer can repeatedly skip over tracks to find a desired portion of the disk. When video disks are applied to such applications as video games, the logic of FIG. 5 is quite often produced wherein the mechanism can be skipped on request by the program to a particular track on the disk in order to display known action recorded at that point. Thus, if a skip is requested at decision block 5.3, at action block 5.4 the logic picks up the new track number, at action block 5.5, it skips one track towards the new track, and at decision block 5.6, it checks to see if it is at the new track; if it is, it returns to the beginning of the loop to check for end of track and, if not, it returns to action block 5.5 to skip one more track.

Easily implemented additional features are often provided in conjunction with the "skip to next track" block 5.2 in a disk system. These are shown in the additional logic of FIG. 6. Having found the end of track at decision block 5.1, as duplicated in FIG. 6, at decision block 6.1 the logic next checks to see if "stop action" has been selected. If it has, the viewer is simply requesting that the action not proceed. This is easily done by by-passing the "skip to the next track" and allowing the same track to repeat over and over until the stop action has been deleted. If stop action has not been selected, at decision block 6.2 the logic checks to see if "slow motion" has been selected. If it has, a simple delay, as implemented at action block 6.3, before skipping to the next track will cause the motion to be slowed down.

While the foregoing features of the prior art record and playback systems are desirable and provided obvious benefits, they are unable to provide selection of multiple views as would be desirable in certain applications. For example, in a self-study program implemented on a video disk system, a student surgeon (or practicing surgeon looking for self-improvement) might watch a particular surgical technique on a video disk. At various points in the procedure, the student might desire and also receive benefit of a view of the procedure from a different angle than that presently on the screen. In prior art systems, there is no ability for him to see that view unless it is the view originally selected at the time of the video recording of the surgical procedure; or, unless several views are serially recorded, say a minute or two per view, and then viewed successively. The latter approach may present all the desirable views, but cannot do so in real time and, therefore, destroys the continuity required for learning a complex surgical procedure or the like. Wherefore, it is the object of the present invention to provide a video recording and playback system wherein multiple simultaneous views are recorded which can be individually selectable and changeable at the time of viewing.

SUMMARY

The foregoing objective has been achieved by the video record and playback system of the present invention comprising a plurality of video cameras for simultaneously receiving light inputs and generating input electrical video signals at respective outputs thereof reflecting the received light from multiple views; a recording medium in the form of a disk having a plurality of recording tracks thereon for recording video signals; interleaving writing means connected to respective ones of the outputs of the cameras for receiving and writing the input electrical video signals onto the recording track in a pre-established interleaved addressing pattern so that each addressable "track" is comprised of a plurality of "subtracks" which are respective ones of the recording tracks with one of the subtracks for each video signal from each camera; reading means for subsequently reading the recorded signal on a one of the subtracks sequentially from respective ones of the tracks and for generating an output electrical video signal reflecting the read signal; video display means operably connected to receive the output video signal for displaying a visual representation thereof; and, view changing means for selectively changing the one of the subtracks being read by the reading means.

DESCRIPTION OF THE PREFERRED EMBODIMENT

The system of the present invention and its method of operation are depicted in FIGS. 7–10. In the description which follows, four simultaneous views are employed. Those skilled in the art will recognize that more views or less views could be employed by increasing or decreasing the number of cameras and tracks as appropriate.

Figure 7:
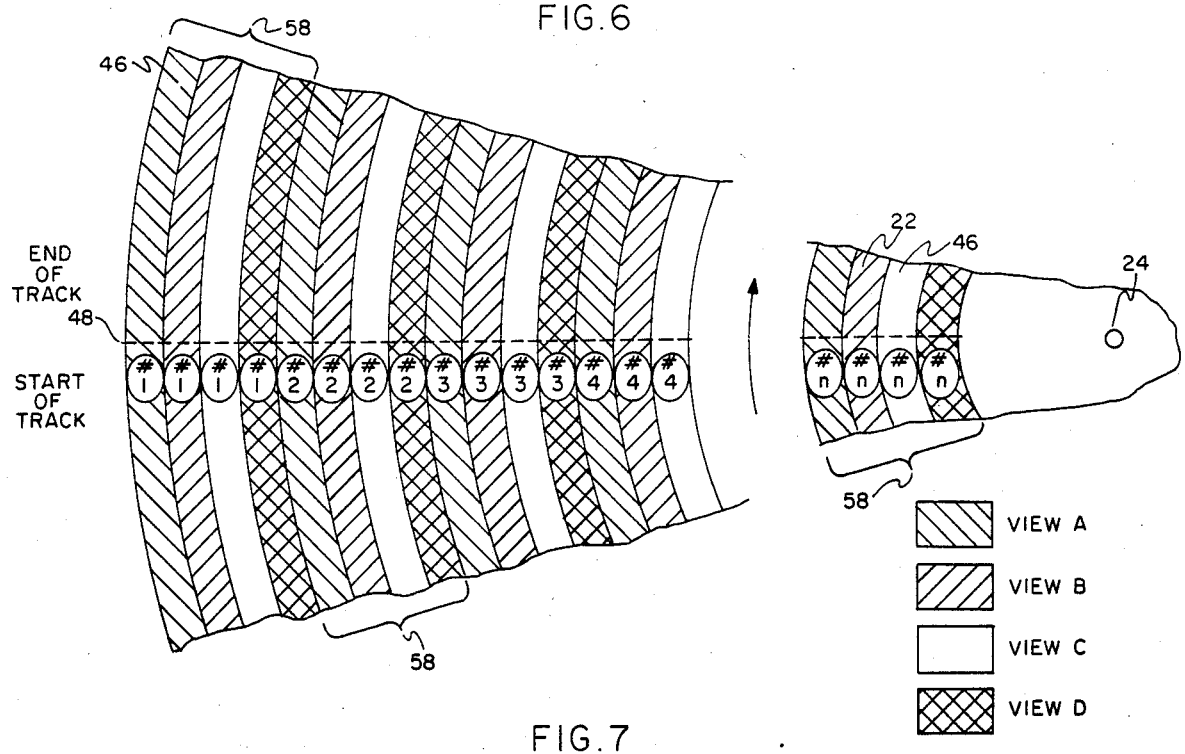
FIG. 7 is a plan view showing the track layout according to one embodiment of the present invention.
Figure 8:
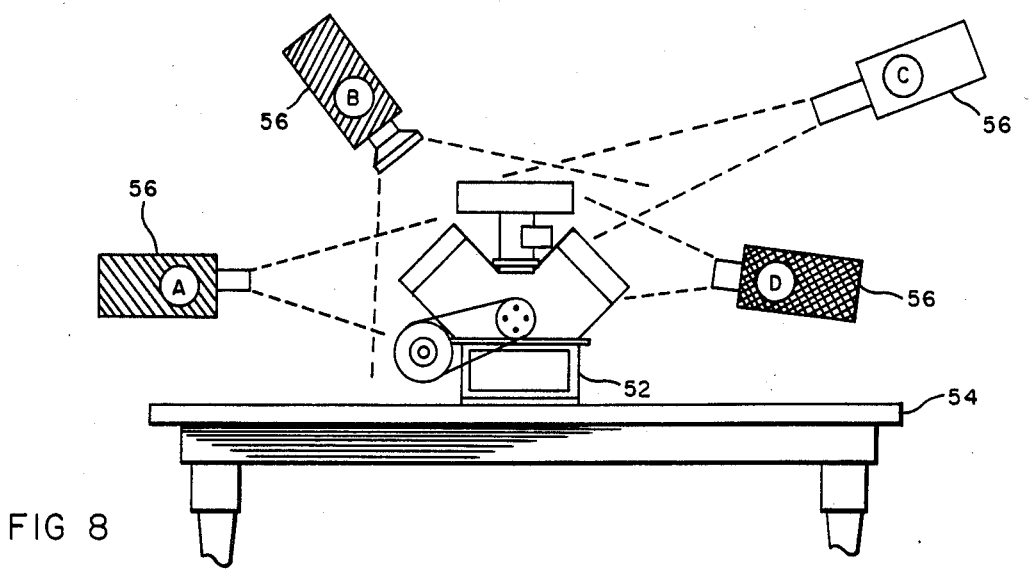
FIG. 8 is a simplified elevation of an object being recorded according to the method and with the apparatus of the present invention.

In FIG. 8, an engine 52 is shown on a workbench 54. Assume that a mechanic (not shown) is to perform a repair procedure on the engine 52 according to the present invention. In such case, a plurality of cameras 56 are placed to simultaneously view the engine 52 and repair procedure from different angles. In FIG. 8, the cameras 56 are labeled "A", "B", "C", and "D", respectively. As can be seen, each of the cameras 56 has been marked in a different manner to correspond to the track designations in FIG. 7 for ease of identification. As can be seen in FIG. 7, each of the individual tracks 46 on the disk 22 is a "subtrack" in the present system. Four contiguous subtracks 46, as designated 58, comprise an addressable "track" within the present system. It should be recognized that track 58, #1, comprises the first frame of the view from camera "A" followed by the first frame from camera "B", then the view from camera "C", and finally the view from camera "D". This then repeats for the second frame, et sequence. Those skilled in the art will recognize that while the four views at each frame are consecutive in the track layout of FIG. 7, different patterning and interleaving of the data on the tracks 46 of the disk 22 could be employed within the scope and spirit of the present invention. For example, all the view A's subtracks 1−n could be consecutively recorded followed by all the view B's, then the C's, and finally the D's. All that is required is a pre-established addressing pattern wherein each addressable "track" is comprised of a plurality of "subtracks", with one addressable subtrack designation for each video signal from each camera 56.

Figure 1:
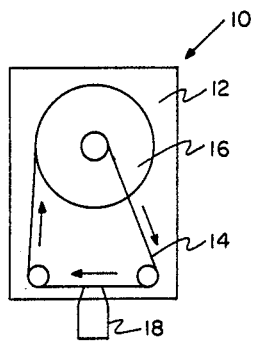
FIG. 1 is a simplified plan view of an 8-track cassette system.
Figure 2:
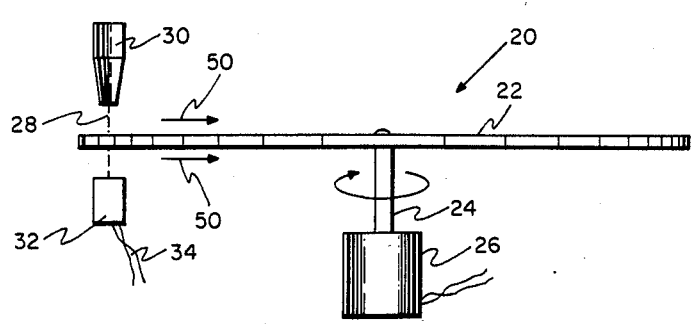
FIG. 2 is a simplified elevation view of a video disk system.
Figure 3:
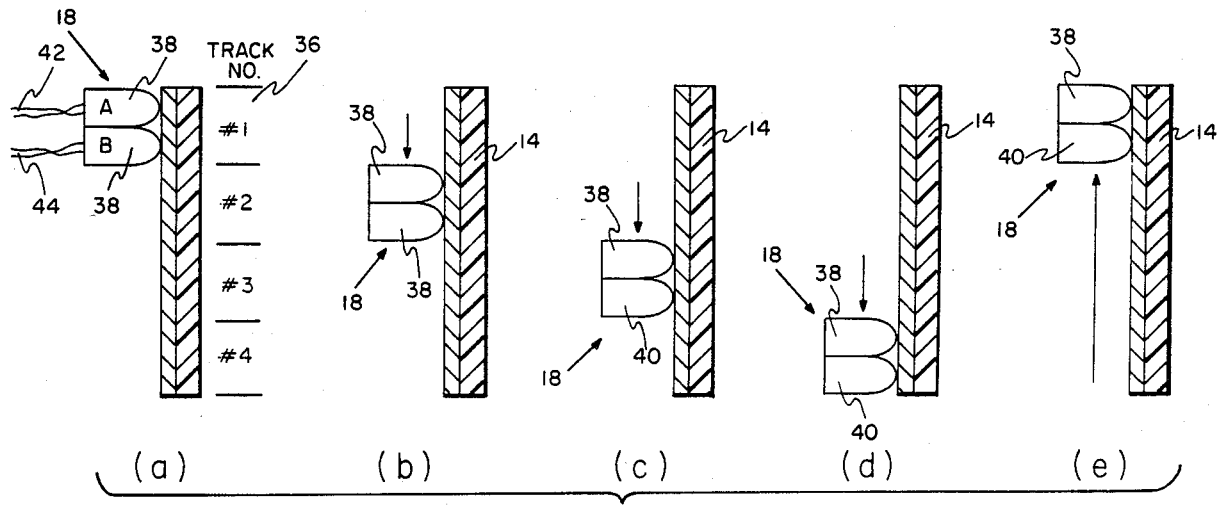
FIG. 3, consisting of (a)–(e), is a simplified drawing showing the track sequencing performed in playing the 8-track cartridge of FIG. 1.
Figure 4:
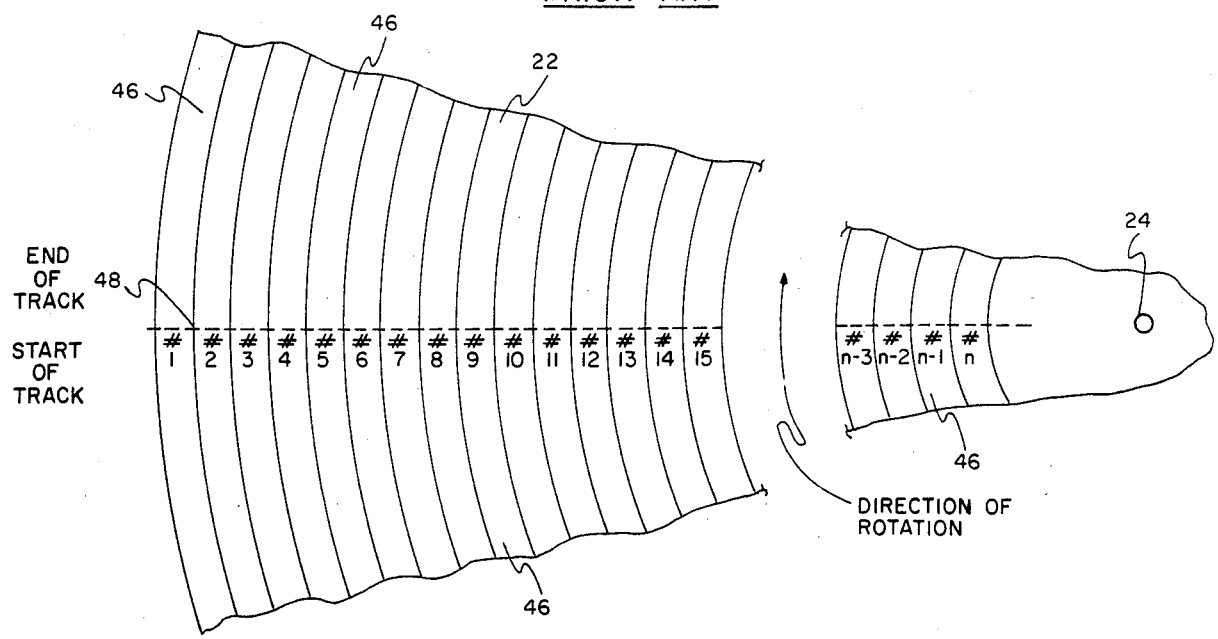
FIG. 4 is a plan view showing the track layout of the video disk of FIG. 2.
Figure 9:
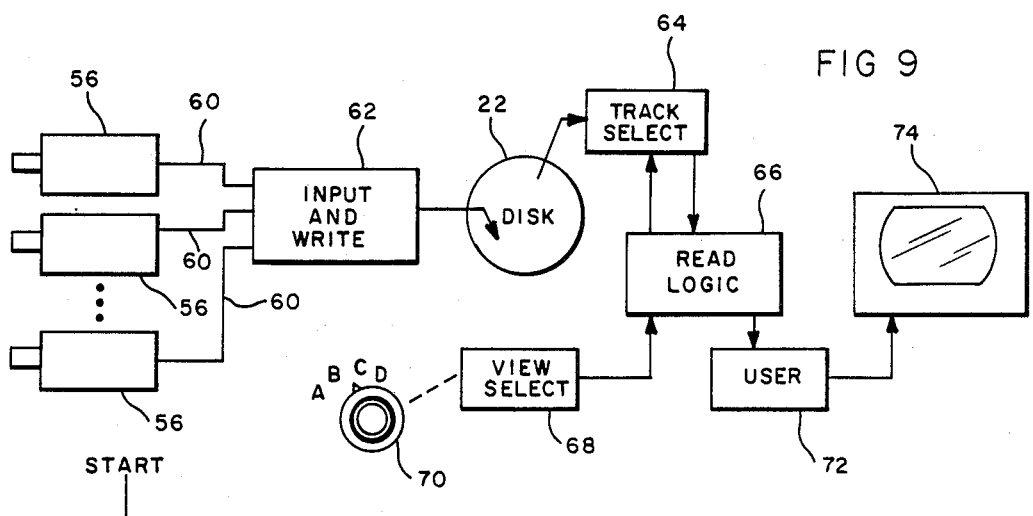
FIG. 9 is a simplified block diagram of a record and playback video system according to the present invention.
Figure 10:
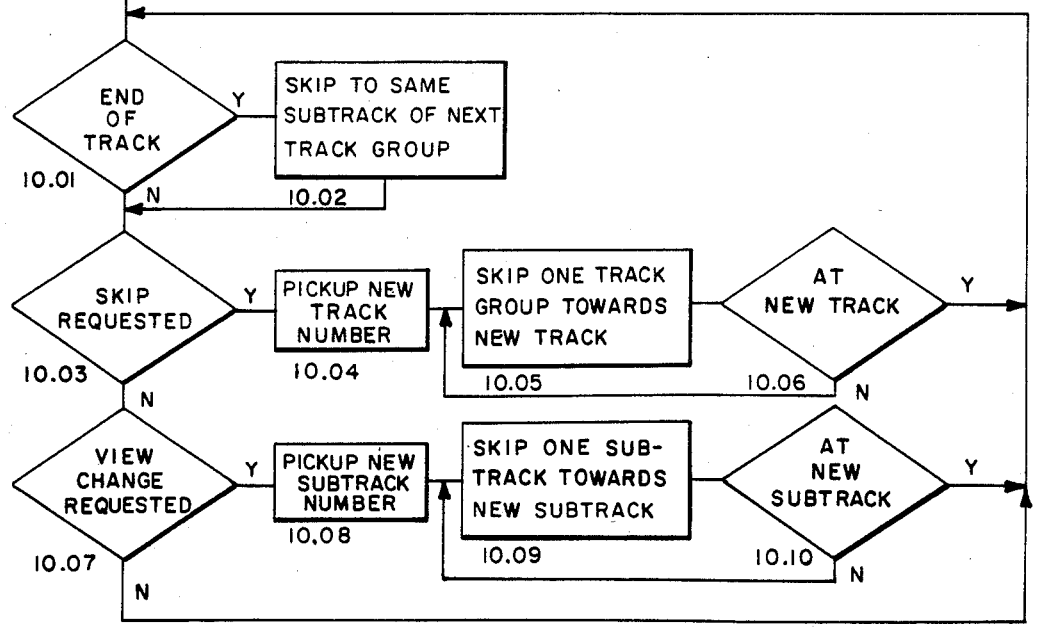
FIG. 10 is a simplified logic diagram showing the track switching logic employed in the system of FIG. 9 to accomplish the objectives of the present invention.

The system of the present invention is shown in simplified block diagram form in FIG. 9 and exemplary logic as could be employed therein to accomplish the purposes of the present invention is shown in FIG. 10. As shown in FIG. 9, the electrical outputs 60 from the cameras 56 are controlled by input and write apparatus 62 to record the electrical signals from the cameras 56 onto the disk 22. To create a disk 22 configured in the manner of FIG. 7, four laser sources 30 could be disposed side-by-side in the manner of the two heads 18 of FIG. 3, to write four tracks 46 on the disk 22 simultaneously. If a different addressing pattern is employed, the input and write apparatus 62 would, of course, have to be modified accordingly. The manner of accomplishing this should be obvious to those skilled in the art and, accordingly, no greater detail thereof is provided to prevent redundancy. Those skilled in the art will recognize that this is a simplified description showing only the critical changes in equipment and approach. In the more usual approach of a commercial production of the video disk and subsequent playback by the viewer on equipment designed for playback only, the initial recording would most likely be done on four one-inch video tape recorders. The four tapes would then be interleaved, by fours, onto a new master one-inch tape in a frame-by-frame automatic editing system. Finally, the master tape would be used to create master disks (laser, LED, etc.) used to make the production disks which are bought by the viewer. This should be kept in mind with respect to this specification and the claims appended thereto.

Once the disk 22 has been recorded, whether in a combination playback and recording machine or on typical video disk production equipment used to prerecord video disks, the contents thereof can be read and displayed subsequently by the remaining components of FIG. 9 according to the logic of FIG. 10. Block 64 labeled as "TRACK SELECT" represents the physical apparatus for moving the laser sources 30 and photodetectors 32 with relationship to the tracks 46 on the disk 22. With four subtracks 46 comprising each major addressable track 58, four laser sources 30 and four photodetectors 32 disposed adjacent one another would be employed. Block 66 labeled "READ LOGIC" represents the logic of FIG. 10 which will be described shortly. "VIEW SELECT" block 68 and operably attached selector switch 70 represents the interface to the viewer whereby the viewer can continuously and instantaneously select which one of the views A, B, C, or D he wishes to watch at any moment. Block 72 labeled "USER" represents any additional functions and is also connected to drive the display 74 which receives the selected subchannel video signal and displays it as a visual representation thereof. There again, the USER function 72 and display 74 are all well known to those skilled in the art and, to conserve space and avoid redundancy, further explanation thereof is not incorporated as part of this specification.

With particular reference to FIG. 10, the READ LOGIC 62 in combination with the TRACK SELECT apparatus 64 at decision block 10.01 first checks for an end of track condition. If the end of track has been achieved, at action block 10.02 the logic causes TRACK SELECT apparatus 64 to skip to the same subtrack of the next track group. Thus, for example, if the end of track 48 for view D of frame #1 (the crosshatched track) had been sensed, the read function would be skipped across four tracks 46 (being four subtracks of the main addressable "track" 58) to the view D track 46 of frame #2. That is, having read the fourth track from the edge as FIG. 7 is viewed, the read function would be skipped to the eighth track as the figure is viewed.

Figure 5:
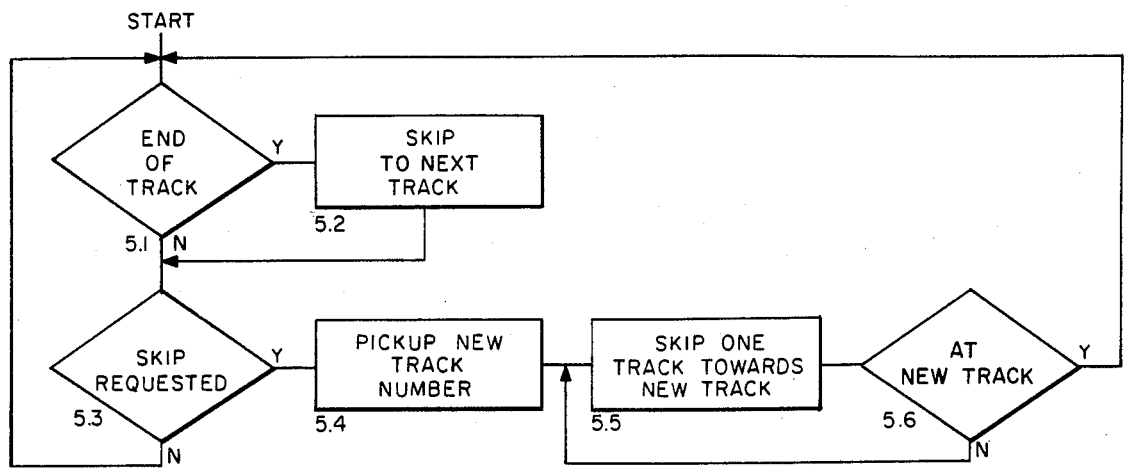
FIG. 5 is a simplified logic diagram showing the tracking logic employed with the video disk of FIGS. 2 and 4.
Figure 6:
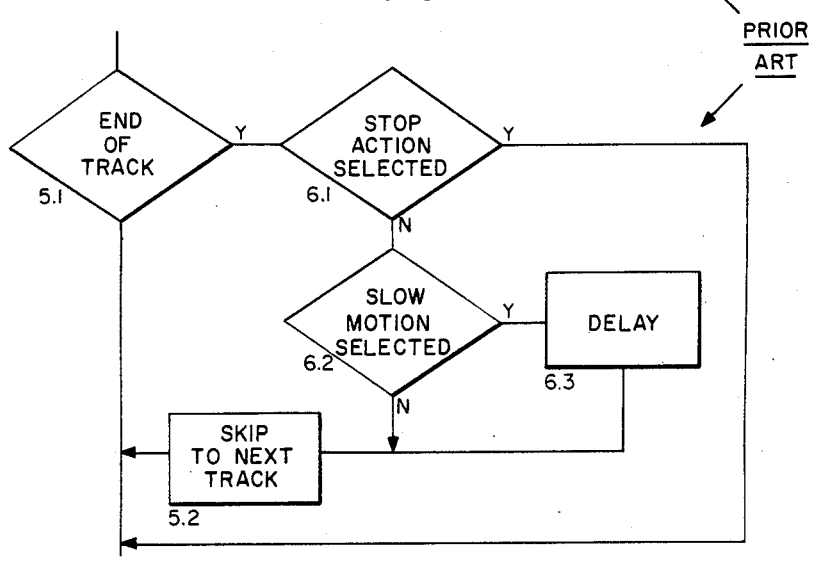
FIG. 6 is a simplified block diagram showing additional features which have been added in the prior art to the video disk system of FIGS. 2 and 4.

At decision block 10.03, the logic checks to see if a skip has been requested in the manner of the logic of FIG. 5. If it has, in a similar manner to the logic contained therein, the logic at action block 10.04 picks up the new track number, at action block 10.05, it skips one track group towards the new track; that is, skips from a subtrack 46 for a given view to the next same view subtrack 46 in the direction towards the new track 58 or four subtracks 46. At decision block 10.06, the logic checks to see if the new track has been arrived at. If it has, the logic proceeds back to the starting point and if not, returns to action block 10.05.

To this point, the logic of FIG. 10 is very similar to that of FIG. 5, except that the skipping is by major addressable "tracks" 58 as opposed to single tracks (now subtracks) 46. To accomplish the major objective of view selectability, however, additional logic is provided. At decision block 10.07, the logic next checks to see if a view change has been requested; that is, has the viewer changed the position of selector switch 70. If he has not, the logic returns back to the beginning of the loop at START. If a change of view has been requested, at action block 10.08 the logic picks up the new subtrack number; that is, the number of the subtrack 46 within the track grouping 58 corresponding to the position of the selector switch 70. At action block 10.09 the logic next skips one subtrack 46 within the track grouping 58 towards the new subtrack. At decision block 10.10 the logic next checks to see if the new subtrack is now the subtrack now being read. If it is, the change in view has been completed and the logic returns to START. If not, it returns to action block 10.09.

Thus, from the foregoing description, it can be seen that the method and apparatus of the present invention provides an improvement to video record/playback systems, as desired, wherein a viewer watching action in progress can instantaneously select between a number of views of that same action to suit his own desires and wishes as opposed to being limited to with a single view sequence as originally provided.

Wherefore, having thus described my invention, I claim:

1. A video record and playback system comprising:
   (a) a plurality of video cameras positioned to view a particular scene from different vantage points for simultaneously receiving images and generating electrical video signals at respective outputs thereof at standard television frame rates representing the received images from the multiple vantage points;
   (b) a recording medium having a plurality of recording tracks thereon for recording video signals;
   (c) interleaving writing means connected to respective ones of said outputs of said cameras for receiving and writing said electrical video signals onto said recording tracks in a pre-established interleaved addressing pattern so that each addressable "track" is comprised of a plurality of "subtracks" equal to the number of vantage points which are respective ones of said recording tracks with one said subtrack for each said video signal from each said camera;
   (d) reading means for subsequently reading the recorded signal on ones of said subtracks corresponding to a particular one of said vantage points sequentially from respective ones of said tracks and for generating an output video signal at standard television frame rates from said read signal;
   (e) video display means operably connected to receive said output video signal for displaying a visual representation thereof; and,
   (f) vantage point changing means for selectively changing said ones of said subtracks being read by said reading means to enable viewing of another of said vantage points.

2. A method for providing a selectable view video record and playback system comprising the steps of:
   (a) simultaneously operating a plurality of video cameras positioned to view a particular scene from different vantage points to receive images thereto of a plurality of the vantage points to be recorded and to produce electrical video signals at respective outputs of the cameras at standard television frame rates reflecting the received images from the vantage points;
   (b) receiving and writing the electrical video signals onto the recording tracks of a video recording medium having a plurality of recording tracks thereon for recording video signals in a pre-established addressing pattern wherein each addressable "track" is comprised of a plurality of "subtracks" with one subtrack for the video signal from each camera;

(c) subsequently reading the recorded signal on ones of the subtracks corresponding to a particular one of said vantage points sequentially from respective ones of the tracks to generate an output electrical video signal at standard television frame rates reflecting the contents of the read signal;

(d) operably connecting the received output video signal to a video display to drive the video display in a visual representation thereof; and, (e) selectively changing the ones of the subtracks being read to change the vantage point being observed.

3. A video record and playback system comprising:

(a) recording means for recording video signals of simultaneous multiple vantage points of a scene at standard television frame rates onto a recording medium having a plurality of recording tracks thereon for recording video signals, said recording means being adapted for recording said video signals in a pre-established interleaved addressing pattern so that each addressable "track" is comprised of a plurality of "subtracks" which are respective ones of said recording tracks with one said subtrack for each of said vantage points;

(b) reading means for subsequently reading the recorded signal on ones of said subtracks sequentially from respective ones of said tracks and for generating an output video signal at standard television frame rates reflecting said read signal;

(c) video display means operably connected to receive said output video signal for displaying a visual representation thereof; and, (d) view changing means for selectively changing said one of said subtracks being read by said reading means to change the displayed vantage point.

* * * * *